(12) United States Patent
Chhabra et al.

(10) Patent No.: US 11,372,965 B2
(45) Date of Patent: Jun. 28, 2022

(54) APPLICATION WITH SELF-CONFIGURING ACCESSIBILITY SETTINGS

(71) Applicant: Microsoft Technology Licensing, LLC, Redmond, WA (US)

(72) Inventors: Shalendra Chhabra, Seattle, WA (US); Gregory P. Baribault, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 502 days.

(21) Appl. No.: 16/409,642

(22) Filed: May 10, 2019

(65) Prior Publication Data

US 2020/0356656 A1 Nov. 12, 2020

(51) Int. Cl.
*G06F 21/44* (2013.01)
*G06F 9/54* (2006.01)

(52) U.S. Cl.
CPC .............. *G06F 21/44* (2013.01); *G06F 9/543* (2013.01)

(58) Field of Classification Search
None
See application file for complete search history.

(56) References Cited

U.S. PATENT DOCUMENTS

| | | |
|---|---|---|
| 7,487,096 B1 | 2/2009 | Cox et al. |
| 7,554,522 B2 | 6/2009 | Sinclai et al. |
| 2002/0152255 A1 | 10/2002 | Smith et al. |
| 2008/0043996 A1 | 2/2008 | Dolph et al. |
| 2016/0014476 A1 | 1/2016 | Caliendo et al. |
| 2018/0024845 A1 | 1/2018 | Card et al. |

FOREIGN PATENT DOCUMENTS

WO    2016210195 A1    12/2016

OTHER PUBLICATIONS

"International Search Report and Written Opinion Issued in PCT Application No. PCT/US2020/026798", dated Jul. 17, 2020, 11 Pages.
"Accessibility on iOS", Retrieved from: https://web.archive.org/web/20190121043126/https://developer.apple.com/accessibility/ios/, Jan. 21, 2019, 2 Pages.
"Build Accessibility Services", Retrieved from: https://web.archive.org/web/20190315092056/https://developer.android.com/guide/topics/ui/accessibility/services.html, Mar. 15, 2019, 24 Pages.
"Test Your App's Accessibility", Retrieved from: https://web.archive.org/web/20190112133458/https://developer.android.com/training/accessibility/testing, Jan. 12, 2019, 12 Pages.

*Primary Examiner* — Syed A Roni
(74) *Attorney, Agent, or Firm* — NovoTechIP International PLLC (57) ABSTRACT

An application with self-configuring accessibility settings is described. The application is configured to interact with an operating system of a computing device upon which the application is executing to obtain information relating to one or more user-configurable accessibility settings of the operating system. Such interaction may occur via an application programming interface exposed by the operating system. Based on the information obtained from the operating system, the application then determines one or more accessibility settings of the application, which may include identifying the one or more accessibility settings of the application based on a correspondence to the one or more accessibility settings of the operating system. The application then applies the one or more application accessibility settings either automatically or after obtaining user approval.

20 Claims, 6 Drawing Sheets

Computing Device 102
Display Screen 402
Application user interface 126
Do you want to enable closed captions in Teams?
Yes    No

502 — Identify the one or more application accessibility settings based on a correspondence to the one or more accessibility settings of the operating system

APPLICATION WITH SELF-CONFIGURING ACCESSIBILITY SETTINGS

BACKGROUND

Accessibility refers to the design of products, devices, services, or environments for people with disabilities. The concept of accessible design ensures both "direct access" (i.e., unassisted access) and "indirect access" meaning compatibility with a person's assistive technology (e.g., computer screen readers). With our society's ever-growing reliance on technology, a need arose to remove barriers that prevented interaction with, or access to, computing devices by people with disabilities. For instance, different accessibility features relating to visual impairment, hearing impairment and dexterity impairment, such as magnifiers, closed captioning, and input device shortcuts, respectively, have been implemented into computing devices to make them universally accessible to people with and without disabilities.

Today, many operating systems (OSes) are designed to provide users with access to an array of different OS-level accessibility features. Such OSes typically also provide a user interface (UI) (e.g., a graphical user interface (GUI), voice interface, or the like) via which a user can turn on or off such OS-level accessibility features or adjust certain user-configurable settings associated therewith. Typically, most OS-level accessibility features are turned off by default, and a user must turn on the features and optionally adjust any user-customizable settings associated therewith to their liking. The on/off state of such OS-level accessibility features and the state of any user-configurable settings associated therewith are generally referred to herein as "OS-level accessibility settings" or "OS accessibility settings."

Many applications are also being published today that have their own application-level accessibility features and corresponding application-level accessibility settings. As used herein, the terms "application-level accessibility settings" or "application accessibility settings" generally refers to the on/off and user-customizable settings states of such application-level accessibility features. Such application-level accessibility features are typically operated and managed independently of the aforementioned OS-level accessibility features. This means that a user wishing to take advantage of accessibility features at both the OS level and the application level must manage multiple sets of overlapping and/or non-overlapping accessibility settings via entirely different UIs (e.g. an OS UI and an application UI). Interacting with these multiple UIs to adjust the various accessibility settings to the user's liking can be a very time-consuming and complicated process as the user must hunt through the respective UIs to discover and set up various accessibility features. Moreover, the process may be confusing in that the OS and the application may have a same or similar accessibility feature that is identified using different names. For instance, an OS may call the accessibility feature of displaying text on a screen "closed captioning" while an application may call the same accessibility feature "subtitling." Such features may also be configurable in vastly different ways. Accordingly, even when a user is familiar with a particular accessibility feature at the OS level, it can be difficult for the user to find and manage an analogous feature at the application level.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for automatically configuring accessibility settings of an application. In an embodiment, an operating system (OS) and an application are both executing upon a same computing device. The OS maintains one or more user-configurable accessibility settings associated with one or more OS-level accessibility features. The application includes a settings obtainer, a settings determiner, and a settings applier. The settings obtainer sends a request to the OS for information relating to the one or more user-configurable accessibility settings of the OS and receives a response from the OS that includes the information relating to the one or more user-configurable accessibility settings of the OS. The settings determiner determines one or more application accessibility settings based on the information relating to the one or more user-configurable accessibility settings of the OS, wherein the application accessibility settings are associated with one or more application-level accessibility features. The settings applier then applies the one or more application accessibility settings to the application, either automatically or after obtaining user approval to do so.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As described above, many operating systems (OSes) are designed to provide users with access to an array of different OS-level accessibility features. Such OSes typically also provide a user interface (UI) (e.g., a graphical user interface (GUI), voice interface, or the like) via which a user can turn on or off such OS-level accessibility features or adjust certain user-configurable settings associated therewith. Typically, most OS-level accessibility features are turned off by default, and a user must turn on the features and optionally adjust any user-customizable settings associated therewith to their liking. The on/off state of such OS-level accessibility features and the state of any user-configurable settings associated therewith are generally referred to herein as "OS-level accessibility settings" or "OS accessibility settings."

Many applications are also being published today that have their own application-level accessibility features and corresponding application-level accessibility settings. As used herein, the terms "application-level accessibility settings" or "application accessibility settings" generally refers to the on/off and user-customizable settings states of such application-level accessibility features. Such application-level accessibility features are typically operated and managed independently of the aforementioned OS-level accessibility features. This means that a user wishing to take advantage of accessibility features at both the OS level and the application level must manage multiple sets of overlapping and/or non-overlapping accessibility settings via entirely different UIs (e.g. an OS UI and an application UI). Interacting with these multiple UIs to adjust the various accessibility settings to the user's liking can be a very time-consuming and complicated process as the user must hunt through the respective UIs to discover and set up various accessibility features. Moreover, the process may be confusing in that the OS and the application may have a same or similar accessibility feature that is identified using different names. For instance, an OS may call the accessibility feature of displaying text on a screen "closed captioning" while an application may call the same accessibility feature "subtitling." Such features may also be configurable in vastly different ways. Accordingly, even when a user is familiar with a particular accessibility feature at the OS level, it can be difficult for the user to find and manage an analogous feature at the application level.

Embodiments described herein help address these and other issues related to discovering, activating and configuring application-level accessibility settings associated with application-level accessibility features. For instance, embodiments described herein relate to an application that is configured to request and receive information from an OS about OS-level accessibility settings associated with OS-level accessibility features. In embodiments, to achieve this, the application communicates with the OS via an application programming interface (API) that is exposed by the OS. However, this communication may be performed in various ways, such as via a different interface.

Once the application has received the information from the OS about the OS-level accessibility settings, the application determines one or more application-level accessibility settings associated with application-level accessibility features. This determination is based on the received information and may be performed in various ways. For example, the application may determine the application-level accessibility settings associated with application-level accessibility features based on a correspondence to the OS-level accessibility settings associated with OS-level accessibility features. This correspondence may include, for example, a correspondence between settings associated with a same or similar feature (e.g., OS-level closed captioning is turned on, so also turn on application-level closed captioning) or a correspondence between settings associated with features that support a same or similar disability (e.g., an OS-level feature is turned on that supports the hearing impaired, so an application-level feature is turned on that is also for the hearing impaired, even though the OS-level feature and application-level feature are completely different).

Upon determining the one or more application-level accessibility settings associated with the identified application-level accessibility features, the application is further configured to apply the one or more application-level accessibility settings to the application. In this way, the application-level accessibility settings are automatically self-configured based on information received from the OS related to the OS-level accessibility settings. In embodiments, and discussed in greater detail hereinafter, the application-level accessibility settings may be applied to the application in various ways, including automatically applying them to the application or applying them upon receiving user confirmation or approval.

Embodiments described herein further enable the exporting of information related to the OS-level accessibility settings and/or the application-level accessibility settings to remote computing devices. In embodiments, and discussed in greater detail hereinafter, remote applications and programs are thus enabled to automatically self-configure their corresponding accessibility settings associated with accessibility features based on the exported information. In this way, additional applications of the user executing on remote computing devices may be likewise configured, thus improving the user experience at the remote computing devices.

Thus, in accordance with embodiments described herein, the user experience with an application having accessibility features may be greatly improved in that the application may automatically configure its own accessibility features to accommodate a user's needs or preferences without the user having to provide any input to the application (or with only simple approvals or confirmations from the user). This avoids the user having to independently discover and manage multiple sets of overlapping and/or non-overlapping accessibility settings via entirely different UIs (e.g. an OS UI and an application UI), which as noted above can be a very time-consuming and complicated process. Indeed, embodiments may enable a user to take advantage of application-level accessibility features that they might otherwise be unaware of, since such features may not be easily discovered or accessed by the user via the application's UI. Furthermore, such application-level features might be completely different from those offered by the OS.

Embodiments described herein also improve the functioning of the computing devices upon which such applications are executed. For example, since the accessibility settings of the application may be determined automatically without requiring the user to have one or more GUI interactions as they navigate through the application's menus, the efficiency of the computing device is greatly improved. In particular, the consumption of processor, memory, display and power resources of the computing device that would otherwise occur due to such GUI interactions may be avoided by embodiments described herein by virtue of automatically determining and configuring the application accessibility settings. Thus, these resources may all be conserved. Also, since the application can automatically optimize the settings of the application-level accessibility features for a particular user, embodiments described herein automatically improve the user interface of the application for the user.

Figure 1:
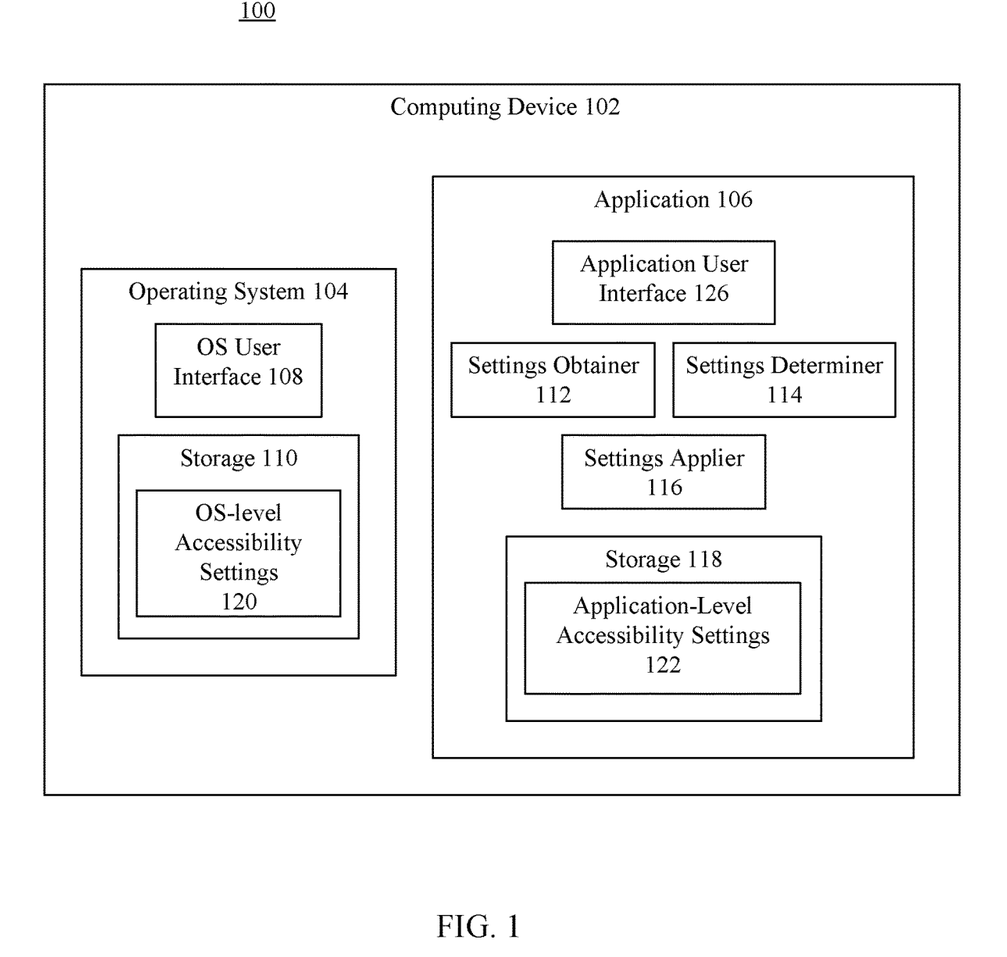
FIG. 1 shows a block diagram of a system for automatically configuring accessibility settings of an application based on application settings of an operating system (OS), according to an example embodiment.

Such embodiments may be implemented in various ways. For instance, FIG. 1 shows a block diagram of a system 100 for automatically configuring accessibility settings of an application based on application settings of an operating system (OS), according to an example embodiment. As shown in FIG. 1, system 100 includes a computing device 102. Computing device 102 may comprise any type of computing device, including a mobile computing device (e.g., a Microsoft® Surface® device, a laptop computer, a notebook computer, a tablet, a netbook, a smart phone, or a portable gaming device) or a stationary computing device (e.g., a desktop computer or a gaming console). Embodiments described herein may also be applicable to wearable computing devices, virtual reality devices or systems, mixed reality devices or systems, augmented reality devices or systems, or any device or system that includes an OS and an application executing thereon.

Computing device 102 represents a computing device configured to execute an OS and an application thereon. For instance, and as shown in FIG. 1, computing device 102 includes an OS 104 and an application 106 that runs on (i.e., utilizes resources of) OS 104 in a well-known manner. OS 104 manages hardware and software resources of computing device 102 and provides common services for computer programs, such as application 106.

OS 104 includes an OS user interface 108 that includes a number of OS-level accessibility features that enable a user to interact with OS 104 in a variety of ways. For example, such OS-level accessibility features may include features that enable a user having a disability or impairment to better interact with OS 104 via OS user interface 108. OS user interface 108 also includes functionality that enables a user to turn on and off such features and optionally adjust various settings associated with such features. These OS-level accessibility settings are stored by OS 104 in storage 110 associated with OS 104 as OS-level accessibility settings 120. Thus, for example, when a user interacts with OS user interface 108 to change accessibility settings associated with the OS-level accessibility features, OS 104 may update such settings in storage 110 to reflect any changes to the settings made by the user.

As noted above, the OS-level accessibility features may include features that facilitate interaction with OS 104 by a user with a disability. For instance, such OS-level accessibility features may improve the user experience for those users having a visual impairment, a hearing impairment, a dexterity impairment, a speech impairment, a motor impairment, a cognitive impairment, repetitive stress, color blindness, or the like. These OS-level accessibility features may include, for example, a text-to-speech feature, an auditory feedback feature, a tactile interface feature, a screen-enlargement feature, visible alerts that accompany audio alerts, a closed captioning feature, a speech-to-text feature, head-mounted input devices and eye-tracking, a mouth-stick feature, a block-suck tube feature, a tongue-activated joystick feature, a chording feature, a sticky keys feature, a slow keys feature, a scanning feature, a reminder feature, a grayscale feature, or the like. However, these examples are not intended to be exhaustive or limiting in any way, and the OS-level accessibility features may include any feature presently known or hereinafter developed for improving access to an OS.

OS-level accessibility settings 120 associated with an OS-level accessibility feature may include whether the feature is turned on or off, whether any sub-features of the feature are turned off, as well as any other user-configurable aspect, parameter, value, or mode associated with the feature that may be stored by OS 104 and used to implement the feature on behalf of a user.

Application 106 may comprise a computer program or process (or a set of computer programs or processes) that operates to perform one or more functions, tasks, or activities for the benefit of a user. Application 106 may comprise any type of application including but not limited to a collaboration application (e.g., Microsoft Teams®), a productivity application (e.g., Microsoft® Word®, Microsoft® PowerPoint®, etc.), a database application (e.g., QuickBooks®, Microsoft® Excel®), an e-mail application (e.g., Microsoft® Outlook®), a search application, a social networking application, a messaging application, a video player application, a music delivery application, a financial services application, a news application, or a game application. However, these examples are not intended to be exhaustive or limiting in any way, and application 106 may comprise any type of application whether presently known or hereinafter developed.

Application 106 includes an application user interface 126 that includes a number of application-level accessibility features that enable a user to interact with application 106 in a variety of ways. For example, such application-level accessibility features may include features that enable a user having a disability or impairment to better interact with application 106 via application user interface 126. Application user interface 126 also includes functionality that enables a user to turn on and off such features and optionally adjust various settings associated with such features. These application-level accessibility settings are stored by application 106 in storage 118 associated with application 106 as application-level accessibility settings 122. Thus, for example, when a user interacts with application user interface 126 to change accessibility settings associated with the application-level accessibility features, application 106 may update such settings in storage 118 to reflect any changes to the settings made by the user.

The application-level accessibility features may include features that facilitate interaction with application 106 by a user with a disability. For instance, such application-level accessibility features may improve the user experience for those users having a visual impairment, a hearing impairment, a dexterity impairment, a speech impairment, a motor impairment, a cognitive impairment, repetitive stress, color blindness, or the like. These application-level accessibility features may include, for example, a text-to-speech feature, an auditory feedback feature, a tactile interface feature, a screen-enlargement feature, visible alerts that accompany audio alerts, a closed captioning feature, a speech-to-text feature, head-mounted input devices and eye-tracking, a mouth-stick feature, a block-suck tube feature, a tongue-activated joystick feature, a chording feature, a sticky keys feature, a slow keys feature, a scanning feature, a reminder feature, a grayscale feature, or the like. However, these examples are not intended to be exhaustive or limiting in any way, and the application-level accessibility features may include any feature presently known or hereinafter developed for improving access to an application.

Application-level accessibility settings 122 associated with an application-level accessibility feature may include whether the feature is turned on or off, whether any sub-features of the feature are turned off, as well as any other user-configurable aspect, parameter, value, or mode associated with the feature that may be stored by application 106 and used to implement the feature on behalf of a user.

It is noted that certain application-level accessibility features of application 106 may be the same as or similar to certain OS-level accessibility features of OS 104. However, certain application-level features of application 106 may be entirely different from (e.g., non-overlapping with) the OS-level accessibility features of OS 104. Moreover, even where OS 104 and application 106 have similar accessibility features, the user-configurable settings that are exposed to the user to manage such features may be very different as between OS 104 and application 106.

Application 106 is configured to obtain information from OS 104 relating to some or all of OS-level accessibility settings 120 and automatically determine certain application-level accessibility settings 122 based on such information. To achieve this, application 106 further includes a settings obtainer 112, a settings determiner 114, and a settings applier 116.

Settings obtainer 112 is configured to request the information relating to OS-level accessibility settings 120 associated with the OS-level accessibility features of OS 104. For example, settings obtainer 112 may be configured to send such a request to OS 104 via an application programming interface (API) of OS 104.

Settings obtainer 112 is configured to receive a response from OS 104 that includes the information relating to OS-level accessibility settings 120 associated with the OS-level accessibility features of OS 104. For example, settings obtainer may be configured to receive such information via an API of OS 104. Such information may include, for example, a list of the OS-level accessibility features that have been activated (e.g., turned on) by a user of computing device 102, a state of any user-configurable aspects of those features, and/or a description of those features. However, these are only examples, and other information may be included, including information relating to features that have not been activated by the user, information about a type, frequency or manner of interaction of the user with a particular OS-level accessibility feature, or the like.

Settings determiner 114 is configured to determine one or more of application-level accessibility settings 122 associated with one or more application-level accessibility features based on the received information relating to OS-level accessibility settings 120. For example, settings determiner 114 may determine certain application-level accessibility settings 122 associated with certain application-level accessibility features based on a correspondence to certain OS-level accessibility settings 120 associated with certain OS-level accessibility features. This correspondence may include, for example, a correspondence between settings associated with a same or similar feature (e.g., OS-level closed captioning is turned on, so also turn on application-level closed captioning) or a correspondence between settings associated with features that support a same or similar disability (e.g., an OS-level feature is turned on that supports the hearing impaired, so an application-level feature is turned on that is also for the hearing impaired, even though the OS-level feature and application-level feature are completely different). However, these examples are not intended to be limiting and settings determiner 114 may determine one or more of application-level accessibility settings 122 based on the received information relating to OS-level accessibility settings 120 in different ways.

Settings applier 116 is further configured to apply the determined application accessibility settings to application 106. In embodiments, said applying may include turning one or more of the application-level accessibility features of application 106 on or off. Said applying may also include configuring a user-configurable aspect, parameter, value, or mode associated with a setting of the application-level accessibility feature. Once the determined application accessibility settings have been applied by settings applier, they may be stored as part of application-level accessibility settings 122 in storage 118.

Settings applier 116 may apply the determined application accessibility settings in a variety of ways. For example, settings applier 116 may automatically apply the determined application accessibility settings to application 106 without any user input. Alternatively, settings applier 116 may first prompt a user of application 106 for approval or confirmation prior to applying the determined application accessibility settings to application 106. In either case, as was noted above, the user experience is improved by virtue of application 106 self-configuring its accessibility settings on behalf of the user and, furthermore, the functioning of computing device 102 is improved by enabling such accessibility settings to be determined in a manner that does not require the user to interact with application user interface 126, thereby consuming various resources of computing device 102.

In an embodiment, application 106 may be configured to perform the foregoing self-configuration process a first time application 106 is launched on computing device 102. In an alternate embodiment, application 106 may perform the foregoing self-configuration process as part of an installation process of application 106. In certain embodiments, the foregoing self-configuration process may be performed by an installer program associated with application 106 rather than by application 106 itself.

In an embodiment, the foregoing self-configuration process may be performed in response to certain user input. For example, a user may interact with application user interface 126 of application 106 to activate a self-configuration feature thereof that will perform the aforementioned operations to automatically configure application-level accessibility settings 122. Application 106 may also be configured to proactively prompt the user to see if the user wishes to activate the self-configuration feature (e.g., at first start-up, in response to determining that the user is having difficulty interacting with the application, or the like).

In an embodiment, the foregoing self-configuration process may be performed on a periodic or intermittent basis by application 106. This may be done, for example, to ensure that application-level accessibility settings 122 are kept in synchronization with OS-level accessibility settings 120 as the OS-level accessibility settings 120 are changed over time, or for other reasons. For instance, application 106 may be configured to perform the foregoing self-configuration process on a daily, weekly, monthly or other basis by default, as configured by the user, or as configured by a computing device administrator. However, these examples are not intended to be limiting and application 106 may perform the foregoing self-configuration process any number of times in a periodic or non-periodic manner.

Figure 2:
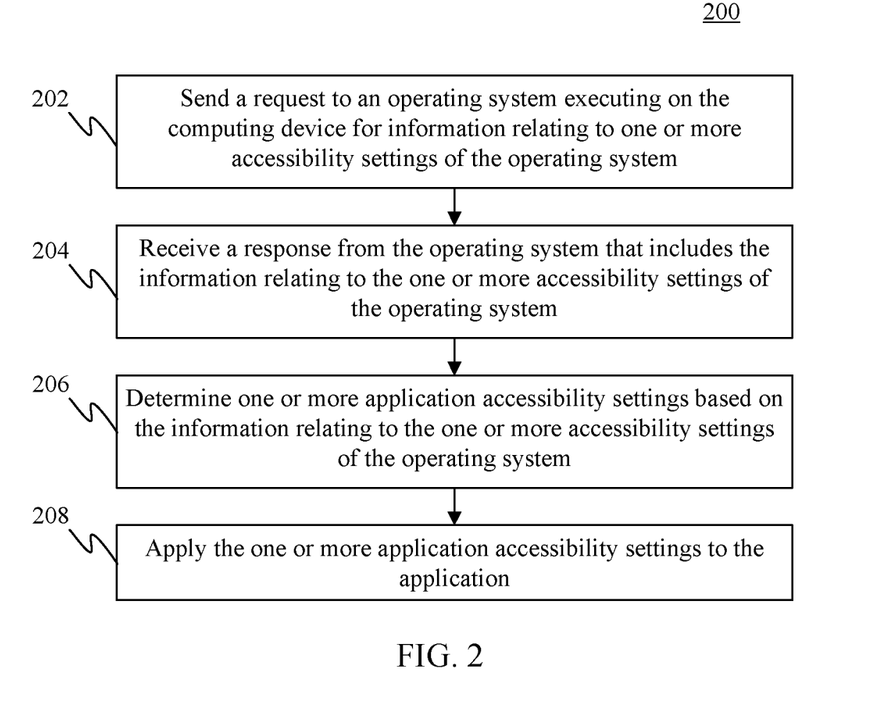
FIG. 2 shows a flowchart of a method for automatically configuring accessibility settings of an application based on application settings of an OS, according to an example embodiment.

To help illustrate the foregoing, FIG. 2 will now be described. In particular, FIG. 2 shows a flowchart 200 of a method for automatically configuring accessibility settings of an application based on application settings of an OS, according to an example embodiment. In an embodiment, flowchart 200 may be implemented by application 106 of FIG. 1. For the purposes of illustration, flowchart 200 of FIG. 2 is described with continued reference to FIG. 1. Other structural and operational embodiments will be apparent to persons skilled in the relevant art(s) based on the following discussion regarding flowchart 200 and FIG. 1.

Flowchart 200 of FIG. 2 begins with step 202. In step 202, a request is sent to an OS executing on the computing device for information relating to one or more accessibility settings of the OS. For instance, and with reference to FIG. 1, settings obtainer 112 may send a request to OS 104 executing on computing device 102 for information relating to OS-level accessibility settings 120 of OS 104.

In step 204, a response is received from the operating system that includes the information relating to the one or more accessibility settings of the operating system. For instance, and with reference to FIG. 1, settings obtainer 112 may receive a response from OS 104 that includes information relating to OS-level accessibility settings 120 of OS 104. In embodiments, the response may include information such as a list of the OS-level accessibility features that have been activated (e.g., turned on) by a user of computing device 102, a state of any user-configurable aspects of those features, and/or a description of those features. However, these are only examples, and other information may be included, including information relating to features that have not been activated by the user, information about a type, frequency or manner of interaction of the user with a particular OS-level accessibility feature, or the like.

In step 206, one or more application accessibility settings are determined based on the information relating to the one or more accessibility settings of the operating system. For instance, and with reference to FIG. 1, settings determiner 114 may determine various application accessibility settings based on information relating to OS-level accessibility settings 120 of OS 104.

In step 208, the one or more application accessibility settings determined in step 206 are applied to the application. For instance, and with reference to FIG. 1, settings applier 116 may apply the determined application accessibility settings to application 106. As noted above, settings applier 116 may perform this function in a variety of ways. For instance, settings applier 116 may apply the determined application accessibility settings to application automatically without requiring user input. Alternatively, settings applier 116 may apply the determined application accessibility settings to application 106 upon user approval, such as user approval in response to a prompt.

Figure 3:
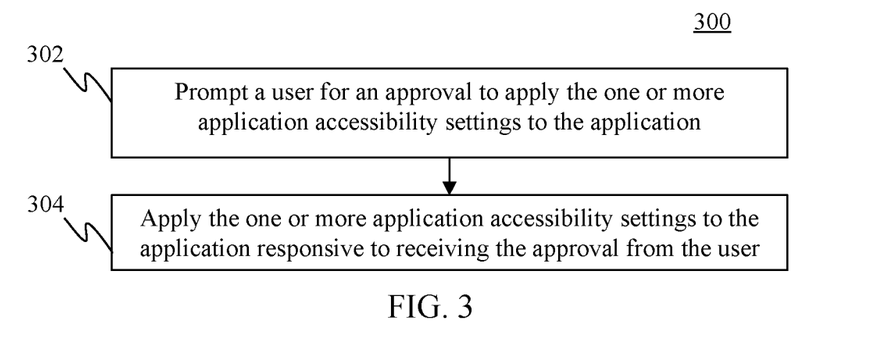
FIG. 3 shows a flowchart of a method for applying automatically-determined application-level accessibility settings to an application, according to an example embodiment.
Figure 4:
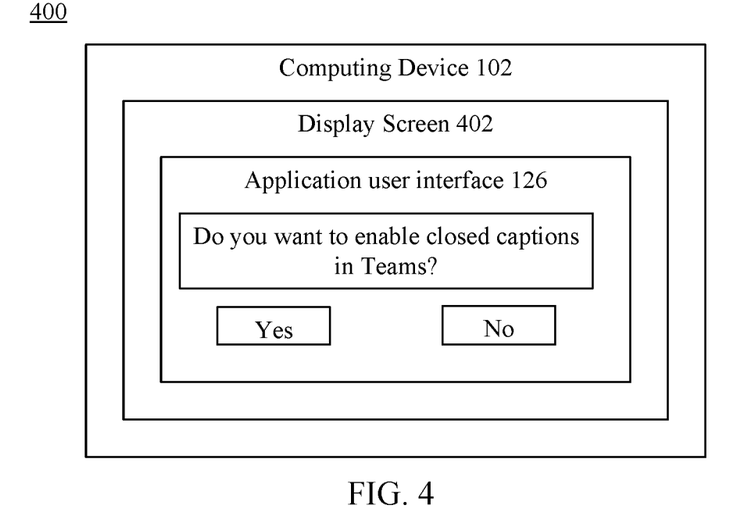
FIG. 4 shows a block diagram of a system for prompting a user prior to applying automatically-determined application-level accessibility settings to an application, according to an example embodiment.

FIG. 3 shows a flowchart 300 of a method for applying automatically-determined application-level accessibility settings to an application, according to an example embodiment. In an embodiment, flowchart 300 may be implemented by settings applier 116 of FIG. 1. For the purposes of illustration, flowchart 300 of FIG. 3 is described with continued reference to FIG. 1 and with respect to FIG. 4. FIG. 4 shows a block diagram of a system 400 for prompting a user prior to applying automatically-determined application-level accessibility settings to an application, according to an example embodiment. As shown in FIG. 4, system 400 includes computing device 102 which, in this embodiment, includes a display screen 402 within which application user interface 404 is displayed. Other structural and operational embodiments will be apparent to persons skilled in the relevant art(s) based on the following discussion regarding flowchart 300, FIG. 1 and FIG. 4.

Flowchart 300 begins with step 302. In step 302, a user is prompted for an approval to apply the one or more application accessibility settings to the application. As noted above, this prompt may follow a determination of the one or more application accessibility settings based on information relating to the one or more accessibility settings of the operating system. For example, if the information relating to the one or more accessibility settings of the operating system indicates that the user is hearing impaired, then one or more application accessibility settings may be determined that would improve the user experience for a user that is hearing impaired, such as using closed captions. For instance, and with reference to FIG. 1 and FIG. 4, settings applier 116 may prompt the user of application 106, which in an example is Teams, by displaying the prompt "Do you want to enable closed captions in Teams? Yes-No" via application user interface 126 within display screen 402. Accordingly, the user may select "Yes" or "No" and settings applier 116 will respond accordingly. For instance, if the user selects "No" then settings applier 116 will not apply the determined application accessibility settings to application 106. However, if the user selects "Yes" then settings applier 116 will apply the determined application accessibility settings to application 106.

In step 304, the one or more application accessibility settings are applied to the application responsive to receiving an approval from the user. For instance, and with reference to FIG. 1 and FIG. 4, upon the user selecting "Yes", settings applier 116 will apply the determined application accessibility settings to application 106.

Figure 5:
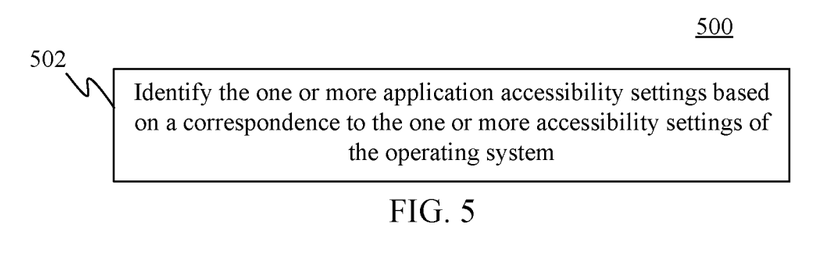
FIG. 5 shows a flowchart of a method for automatically determining one or more application accessibility settings, according to an example embodiment.

As noted above, in embodiments, the application accessibility settings of application 106 may be automatically determined in various ways. For instance, FIG. 5 shows a flowchart 500 of a method for automatically determining one or more application accessibility settings, according to an example embodiment. In an embodiment, flowchart 500 may be implemented by settings determiner 114 of FIG. 1. For the purposes of illustration, flowchart 500 of FIG. 5 is described with continued reference to FIG. 1. Other structural and operational embodiments will be apparent to persons skilled in the relevant art(s) based on the following discussion regarding flowchart 500 and FIG. 1.

Flowchart 500 begins with step 502. In step 502, the one or more application accessibility settings are identified based on a correspondence to the one or more accessibility settings of the operating system. For instance, and with reference to FIG. 1, settings determiner 114 may determine the application-level accessibility settings associated with the application-level accessibility features based on a correspondence to the OS-level accessibility settings associated with OS-level accessibility features. This correspondence may include, for example, a correspondence between settings associated with a same or similar feature (e.g., OS-level closed captioning is turned on, so also turn on application-level closed captioning) or a correspondence between settings associated with features that support a same or similar disability (e.g., an OS-level feature such as closed captioning is turned on that supports the hearing impaired, so an application-level feature such as speech-to-text is turned on since that is also for the hearing impaired, even though the OS-level feature and application-level feature are completely different).

In any of the above-described scenarios, settings determiner 114 may be configured to automatically identify and configure application-level accessibility settings associated with application-level accessibility features based on information about OS-accessibility settings associated with OS-level accessibility features. This feature improves the user experience since the user does not have to search through a list of application-level accessibility settings 122 to identify and configure various accessibility settings that may be of interest to them. Furthermore, the user may not even know of some of the accessibility settings available in application-level accessibility settings 122 either because they are new or not used very often—however, the aforementioned techniques can cause those features to become automatically enabled for the user.

Figure 6:
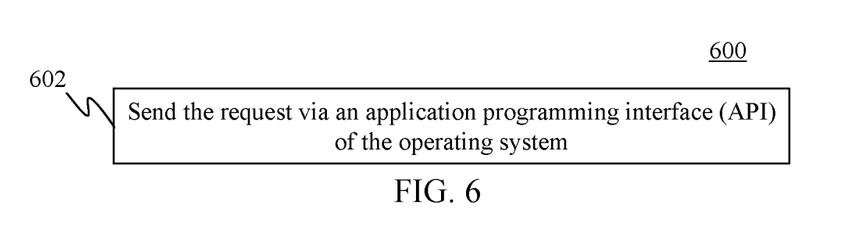
FIG. 6 shows a flowchart of a method for sending a request for information about accessibility settings of an OS to the OS, according to an example embodiment.

In embodiments, application 106 may send the request for information about the OS-level accessibility settings to OS 104 in a variety of ways. For instance, FIG. 6 shows a flowchart 600 of a method for sending to an OS a request for information about accessibility settings of the OS, according to one example embodiment. In embodiments, flowchart 600 may be implemented by settings obtainer 112. As shown in FIG. 6, flowchart 600 begins with step 602. In step 602, the request is sent via an API of the OS. For instance, and with continued reference to FIG. 1, settings obtainer 112 sends the request for information via an API of OS 104. However, this example is not intended to be limiting and settings obtainer 112 may send the request for information in various other ways, such as though a different kind of interface.

Figure 7:
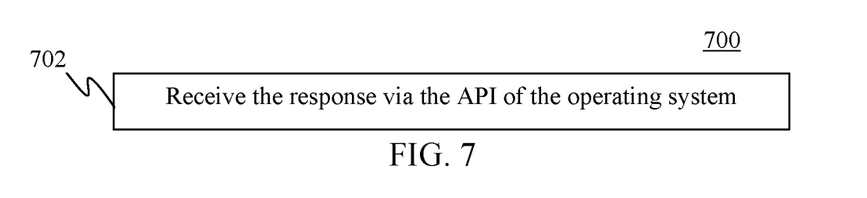
FIG. 7 shows a flowchart of a method for receiving a response to a request for information about accessibility settings of an OS from the OS, according to an example embodiment.

Likewise, in embodiments, application 106 may receive a response from OS 104 in various ways. For instance, FIG. 7 shows a flowchart 700 of a method for receiving from an OS a response to a request for information about accessibility settings of the OS according to an example embodiment. As shown in FIG. 7, flowchart 700 begins with step 702. In step 702, the response including the information is received via the API of the OS. For instance, and with reference to FIG. 1, settings obtainer 112 receives the response including the information via the API of OS 104. However, this example is not intended to be limiting and settings obtainer 112 may receive the response including the information in various other ways, such as through a different kind of interface.

Figure 8:
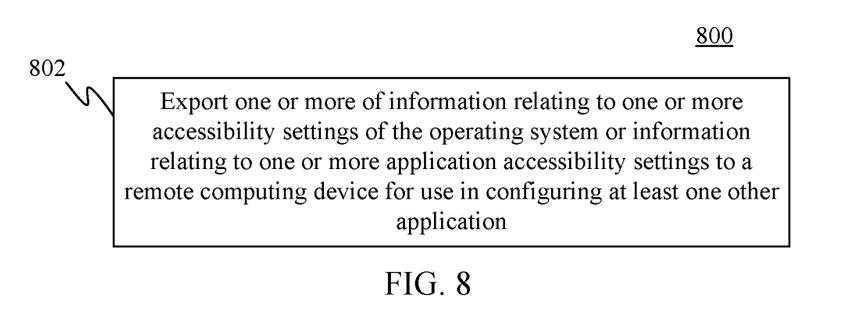
FIG. 8 shows a flowchart of a method for exporting information relating to accessibility settings of an OS or information relating to accessibility settings of an application for use in automatically-determining accessibility settings of another application, according to an example embodiment.

Although the foregoing contemplates an application obtaining information from an OS running on the same computing device to automatically determine application-level accessibility settings, it should be noted that in further embodiments, information about the OS-level accessibility settings of an OS and/or information about the application-level accessibility settings of an application may be exported from a first computing device to one or more remote computing devices to enable applications executing on remote computing devices to also self-configure their accessibility settings. For example, FIG. 8 shows a flowchart 800 of a method for exporting information relating to accessibility settings of an OS and/or information relating to accessibility settings of an application for use in automatically-determining accessibility settings of another application, according to an example embodiment. For the purposes of illustration, flowchart 800 of FIG. 8 is described with continued reference to FIG. 1 and with reference to FIG. 9.

Figure 9:
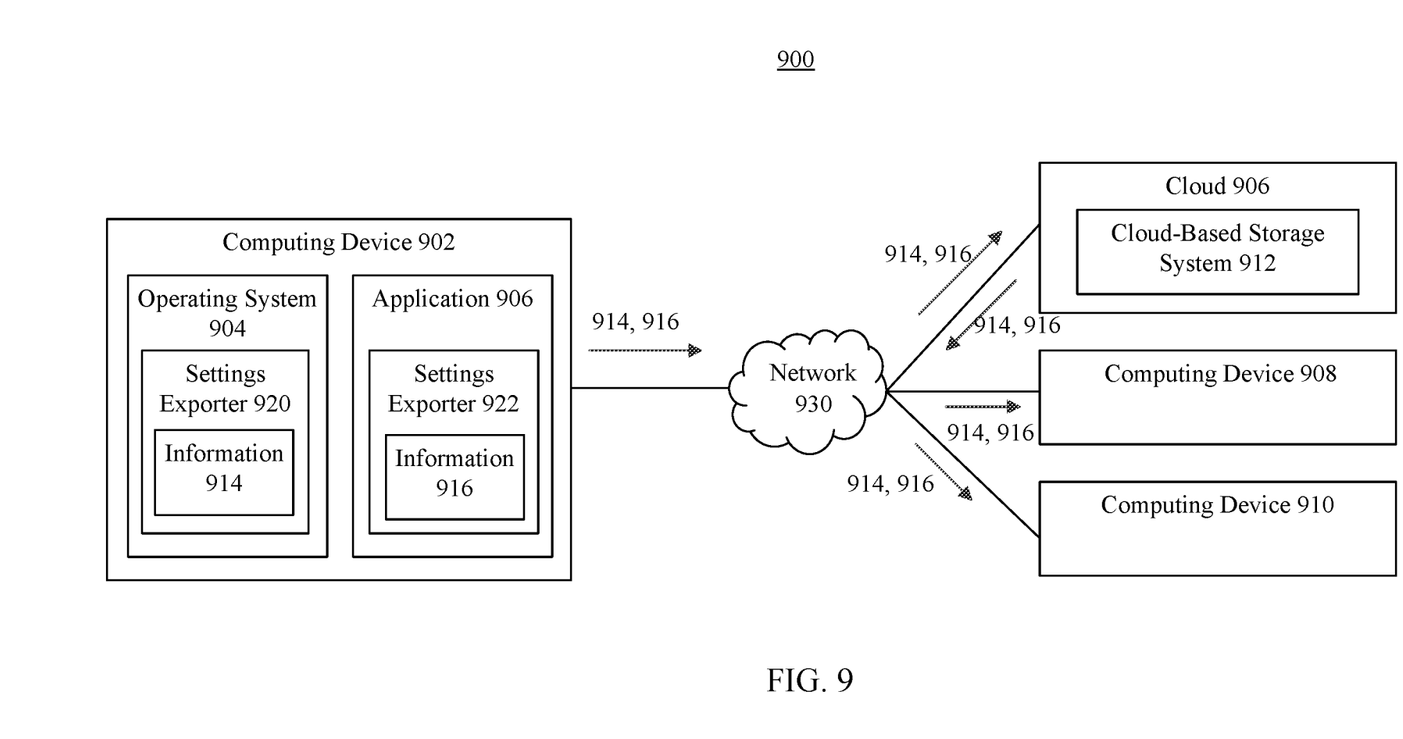
FIG. 9 shows a block diagram of a system for exporting information relating to accessibility settings of an OS and/or information relating to accessibility settings of an application for use in automatically-determining accessibility settings of another application, according to an example embodiment.

FIG. 9 shows a block diagram of a system 900 for exporting information relating to accessibility settings of an OS and/or information relating to accessibility settings of an application for use in automatically-determining accessibility settings of another application, according to an example embodiment. As shown in FIG. 9, a computing device 902 includes an OS 904 and an application 906 which each include a settings exporter 920 and 922, respectively. Computing device 902 is an example of computing device 102 of FIG. 1, OS 904 is an example of OS 104 of FIG. 1, and application 906 is an example of application 906 of FIG. 1.

Furthermore, information 914 is an example of information relating to OS-level accessibility settings 120 of FIG. 1 and information 916 is an example of information relating to application-level accessibility settings 122 of FIG. 1.

As shown in FIG. 9, system 900 includes a cloud-based storage system 912 executing in a cloud 906, a computing device 908, and a computing device 910. Cloud-based storage system 912 may comprise, for example, one or more servers or other cloud-based computing devices that are operable to store data, while computing device 910 and 912 may comprise any type of computing devices including mobile computing devices (e.g., a Microsoft® Surface® device, a laptop computer, a notebook computer, a tablet, a netbook, a smart phone, or a portable gaming device) or stationary computing devices (e.g., a desktop computer or a gaming console). It is noted that although only a certain number of computing devices are shown in system 900, it should be understood that any number of such devices may exist in system 900.

Network 930 represents one or more physical links between computing devices that enable the communication of data there between. Network 930 may include any type of network, including but not limited to a local area network (LAN), wide area network (WAN) such as the Internet, a telecommunication network, or the like. Network 930 may further comprise one or more wired and/or wireless networks or links. Communication over network 930 may be carried out using any of a wide variety of well-known wired and wireless network communication protocols. Other structural and operational embodiments will be apparent to persons skilled in the relevant art(s) based on the following discussion regarding flowchart 800 and FIG. 1 and FIG. 9.

Flowchart 800 begins with step 802. In step 802, one or more of the information relating to the one or more accessibility settings of the operating system or information relating to the one or more application accessibility settings are exported to a remote computing device for use in configuring at least one other application. In the example shown in FIG. 9, settings exporter 920 may export information 914 to cloud-based storage system 912 where it may be accessed by computing device 908 and/or computing device 910. Accordingly, information 914 may be used to configure an application executing on computing device 908 and/or computing device 910. For instance, information 914 may include information relating to OS-level accessibility settings associated with OS-level accessibility features. As such, information 914 may be used to determine and apply one or more application-level accessibility settings of computing device 908 and/or computing device 910. The one or more application-level accessibility settings may be applied automatically or upon user approval, such as in response to a prompt.

Likewise, settings exporter 904 may export information 916 to cloud-based storage system 912 where it may be accessed by computing device 908 and/or computing device 910. Accordingly, information 916 may be used to configure an application executing on computing device 908 and/or computing device 910. For instance, information 916 may include information relating to application-level accessibility settings associated with application-level accessibility features. As such, information 916 may be used to determine and apply one or more application-level accessibility settings of computing device 908 and/or computing device 910. The one or more application-level accessibility settings may be applied automatically or upon user approval, such as in response to a prompt.

In alternate embodiments, settings exporter 920 may export information 914 and/or information 916 directly to either of computing device 908 or computing device 910 and such information may be utilized by those devices, or applications running thereon, to determine and apply one or more application-level accessibility settings of computing device 908 or computing device 910, respectively. The one or more application-level accessibility settings may be applied automatically or upon user approval, such as in response to a prompt.

In still further embodiments, a first application executing on a first computing device can communicate with a second application executing on the same computing device to obtain application-level accessibility settings from the second application. The first application can then use the application-level accessibility settings from the second application to determine its own application-level accessibility settings. The first application may communicate with the second application, for example, via a suitable API. The techniques by which the first application determines its own application-level accessibility settings based on the application-level accessibility settings received from the second application may be similar to those described herein for determining application-level accessibility settings based on OS-level accessibility settings, although other methods may be used as well. Such embodiments advantageously enable applications to self-configure their accessibility settings based on the accessibility settings of other, different, applications.

III. Example Computer System Implementation

Computing device 102, OS 104, application 106, OS user interface 108, storage 110, application user interface 126, settings obtainer 112, settings determiner 114, settings applier 116, storage 118, OS-level accessibility settings 120, application-level accessibility settings 122, display screen 402, computing device 902, operating system 904, application 906, settings exporter 920, settings exporter 922, cloud 906, cloud-based storage system 912, computing device 908, computing device 910, information 914, information 916, flowchart 200, flowchart 300, flowchart 500, flowchart 600, flowchart 700, and/or flowchart 800 may be implemented in hardware, or hardware combined with one or both of software and/or firmware. For example, Computing device 102, OS 104, application 106, OS user interface 108, storage 110, application user interface 126, settings obtainer 112, settings determiner 114, settings applier 116, storage 118, OS-level accessibility settings 120, application-level accessibility settings 122, display screen 402, computing device 902, operating system 904, application 906, settings exporter 920, settings exporter 922, cloud 906, cloud-based storage system 912, computing device 908, computing device 910, information 914, information 916, flowchart 200, flowchart 300, flowchart 500, flowchart 600, flowchart 700, and/or flowchart 800 may be implemented as computer program code/instructions configured to be executed in one or more processors and stored in a computer readable storage medium. Alternatively, Computing device 102, OS 104, application 106, OS user interface 108, storage 110, application user interface 126, settings obtainer 112, settings determiner 114, settings applier 116, storage 118, OS-level accessibility settings 120, application-level accessibility settings 122, display screen 402, computing device 902, operating system 904, application 906, settings exporter 920, settings exporter 922, cloud 906, cloud-based storage system 912, computing device 908, computing device 910, information 914, information 916, flowchart 200, flowchart 300, flowchart 500, flowchart 600, flowchart 700, and/or flowchart 800 may be implemented as hardware logic/electrical circuitry.

For instance, in an embodiment, one or more, in any combination, of computing device 102, OS 104, application 106, OS user interface 108, storage 110, application user interface 126, settings obtainer 112, settings determiner 114, settings applier 116, storage 118, OS-level accessibility settings 120, application-level accessibility settings 122, display screen 402, computing device 902, operating system 904, application 906, settings exporter 920, settings exporter 922, cloud 906, cloud-based storage system 912, computing device 908, computing device 910, information 914, information 916, flowchart 200, flowchart 300, flowchart 500, flowchart 600, flowchart 700, and/or flowchart 800 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
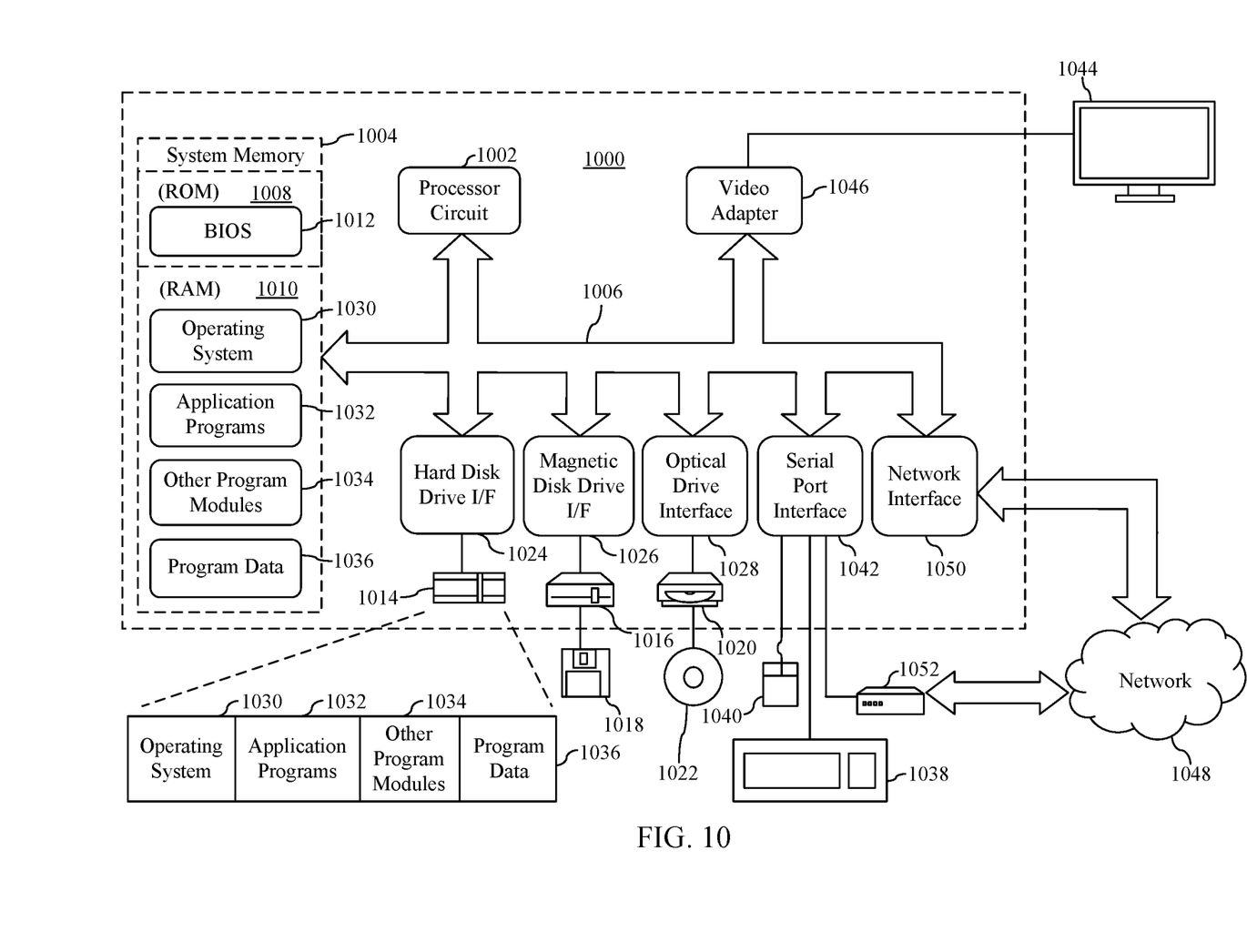
FIG. 10 is a block diagram of an example processor-based computer system that may be used to implement various embodiments.

FIG. 10 depicts an exemplary implementation of a computing device 1000 in which embodiments may be implemented. For example, computing device 102, OS 104, application 106, OS user interface 108, storage 110, application user interface 126, settings obtainer 112, settings determiner 114, settings applier 116, storage 118, OS-level accessibility settings 120, application-level accessibility settings 122, display screen 402, computing device 902, operating system 904, application 906, settings exporter 920, settings exporter 922, cloud 906, cloud-based storage system 912, computing device 908, computing device 910, information 914, information 916, flowchart 200, flowchart 300, flowchart 500, flowchart 600, flowchart 700, and/or flowchart 800 may each be implemented in one or more computing devices similar to computing device 1000 in stationary or mobile computer embodiments, including one or more features of computing device 1000 and/or alternative features. The description of computing device 1000 provided herein is provided for purposes of illustration and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random-access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing any of the features of computing device 102, OS 104, application 106, OS user interface 108, storage 110, application user interface 126, settings obtainer 112, settings determiner 114, settings applier 116, storage 118, OS-level accessibility settings 120, application-level accessibility settings 122, display screen 402, computing device 902, operating system 904, application 906, settings exporter 920, settings exporter 922, cloud 906, cloud-based storage system 912, computing device 908, computing device 910, information 914, information 916, flowchart 200, flowchart 300, flowchart 500, flowchart 600, flowchart 700, and/or flowchart 800 (or any one or more steps of such flowcharts), and/or further embodiments described herein.

A user may enter commands and information into computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A method performed by an application executing on a computing device is described herein. The method comprises sending a request to an operating system executing on the computing device for information relating to one or more accessibility settings of the operating system; receiving a response from the operating system that includes the information relating to the one or more accessibility settings of the operating system; determining one or more application accessibility settings based on the information relating to the one or more accessibility settings of the operating system; and applying the one or more application accessibility settings to the application.

In one embodiment of the foregoing method, the applying the one or more application accessibility settings to the application comprises: prompting a user for an approval to apply the one or more application accessibility settings to the application; and applying the one or more application accessibility settings to the application responsive to receiving the approval from the user.

In another embodiment of the foregoing method, determining the one or more application accessibility settings based on the information relating to the one or more accessibility settings of the operating system comprises: identifying the one or more application accessibility settings based on a correspondence to the one or more accessibility settings of the operating system.

In another embodiment of the foregoing method, sending the request comprises sending the request via an application programming interface (API) of the operating system and wherein receiving the response comprises receiving the response via the API of the operating system.

In another embodiment of the foregoing method, the application is configured to perform the sending, receiving, determining and applying steps on a periodic basis.

In another embodiment of the foregoing method, the one or more application accessibility settings comprise a setting that facilitates interaction with the application by a user with a disability.

In another embodiment of the foregoing method, the one or more application accessibility settings include at least one of: a screen reader feature; a magnifier; closed captioning; or input device shortcuts.

In another embodiment of the foregoing method, the method further comprises exporting one or more of the information relating to the one or more accessibility settings of the operating system or information relating to the one or more application accessibility settings to a remote computing device for use in configuring at least one other application.

In another embodiment of the foregoing method, said applying the one or more application accessibility settings to the application comprises turning one of the one or more application accessibility settings on or off.

A computing device is described herein. The computing device comprises one or more processor circuits; and one or more memory devices communicatively connected to the one or more processor circuits, the one or more memory devices storing computer program logic that is executed by the one or more processor circuits, the computer program logic comprising: an operating system that provides one or more user-configurable accessibility settings; and an application comprising: a settings obtainer configured to send a request to the operating system for information relating to the one or more user-configurable accessibility settings of the operating system and to receive a response from the operating system that includes the information relating to the one or more user-configurable accessibility settings of the operating system; a settings determiner configured to determine one or more application accessibility settings based on the information relating to the one or more user-configurable accessibility settings of the operating system; and a settings applier configured to apply the one or more application accessibility settings to the application.

In one embodiment of the foregoing computing device, the settings applier is configured to: prompt the user for an approval to apply the one or more application accessibility settings to the application; and apply the one or more application accessibility settings to the application responsive to receiving the approval from the user.

In another embodiment of the foregoing computing device, the settings determiner is further configured to: identify the one or more application accessibility settings based on a correspondence to the one or more user-configurable accessibility settings of the operating system.

In another embodiment of the foregoing computing device, the settings obtainer is configured to send the request via an application programming interface (API) of the operating system and to receive the response via the API of the operating system.

In another embodiment of foregoing computing device, the one or more application accessibility settings comprise a setting that facilitates interaction with the application by a user with a disability.

In another embodiment of the foregoing computing device, the one or more application accessibility settings include at least one of: a screen reader feature; a magnifier; closed captioning; or input device shortcuts.

A computer-readable medium having computer program logic recorded thereon that when executed by at least one processor causes the at least one processor to perform a method is described herein. The method comprises: sending a request to a first application executing on a computing device for information relating to one or more accessibility settings of the first application; receiving a response from the first application that includes the information relating to the one or more accessibility settings of the first application; determining one or more application accessibility settings of a second application based on the information relating to the one or more accessibility settings of the first application; and applying the one or more application accessibility settings of the second application to the second application.

In one embodiment of the foregoing computer-readable medium, the applying the one or more application accessibility settings of the second application to the second application comprises: prompting a user for an approval to apply the one or more application accessibility settings of the second application to the second application; and applying the one or more application accessibility settings of the second application to the second application responsive to receiving the approval from the user.

In another embodiment of the foregoing computer-readable medium, the determining the one or more application accessibility settings of the second application based on the information relating to the one or more accessibility settings of the first application comprises: identifying the one or more application accessibility settings of the second application based on a correspondence to the one or more accessibility settings of the first application.

In another embodiment of the foregoing computer-readable medium, sending the request comprises sending the request via an application programming interface (API) and wherein receiving the response comprises receiving the response via the API.

In another embodiment of the foregoing computer-readable medium, the one or more application accessibility settings of the second application comprise a setting that facilitates interaction with the second application by a user with a disability.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method performed by an application executing on a computing device, the method comprising:
sending, to an operating system (OS) executing on the computing device, a request for information relating to one or more OS accessibility settings defining one or more of OS-level accessibility features that facilitate a user's interaction with the computing device;
receiving, from the OS, a response including the information relating to the one or more OS accessibility settings;
determining, based on the received response, a correspondence between one or more of OS-level accessibility features and one or more application-level accessibility features, wherein the one or more application-level accessibility features facilitate the user's interaction with the application;
determining, based on the determined correspondence, one or more application accessibility settings defining the one or more application-level accessibility features; and
applying the one or more application accessibility settings to a user interface associated with the application.

2. The method of claim 1, wherein applying the one or more application accessibility settings to the user interface associated with the application comprises:
prompting a user for an approval to apply the one or more application accessibility settings to the application; and
applying the one or more application accessibility settings to the application responsive to receiving the approval from the user.

3. The method of claim 1, wherein determining the one or more application accessibility settings comprises identifying the one or more application accessibility settings based on the determined correspondence.

4. The method of claim 1, wherein:
sending the request comprises sending the request via an application programming interface (API) of the OS, and
receiving the response comprises receiving the response via the API of the OS.

5. The method of claim 1, further comprising causing the application to periodically perform sending the request, receiving the response, determining the correspondence, determining the one or more application accessibility settings, and applying the one or more application accessibility settings.

6. The method of claim 1, wherein the one or more application accessibility settings comprise a setting that facilitates interaction with the application by a user with a disability.

7. The method of claim 1, wherein the one or more application accessibility settings include at least one of:
a screen reader feature;
a magnifier;
closed captioning; and
input device shortcuts.

8. The method of claim 1, further comprising exporting the information relating to the one or more OS accessibility settings or information relating to the one or more application accessibility settings to a remote computing device for use in configuring at least one other application.

9. The method of claim 1, wherein applying the one or more application accessibility settings to the user interface associated with the application comprises turning one of the one or more application accessibility settings on or off.

10. A computing device executing an operating system (OS) and an application, comprising:
- a processor; and
- a computer-readable medium in communication with the processor and storing instructions that, when executed by the processor, cause the processor to control the application to perform:
    - sending, to the OS, a request for information relating to one or more OS accessibility settings defining one or more of OS-level accessibility features that facilitate a user's interaction with the computing device;
    - receiving, from the OS, a response including the information relating to the one or more OS accessibility settings;
    - determining, based on the received response, a correspondence between one or more of OS-level accessibility features and one or more application-level accessibility features, wherein the one or more application-level accessibility features facilitate the user's interaction with the application;
    - determining, based on the determined correspondence, one or more application accessibility settings defining the one or more application-level accessibility features; and
    - applying the one or more application accessibility settings to a user interface associated with the application.

11. The computing device of claim 10, wherein, for applying the one or more application accessibility settings to the user interface associated with the application, the instructions, when executed by the processor, further cause the processor to control the application to perform:
- prompting a user for an approval to apply the one or more application accessibility settings to the application; and
- applying the one or more application accessibility settings to the application responsive to receiving the approval from the user.

12. The computing device of claim 10, wherein, for determining the one or more application accessibility settings, the instructions, when executed by the processor, further cause the processor to control the application to perform identifying the one or more application accessibility settings based on the determined correspondence.

13. The computing device of claim 10, wherein:
- for sending the request, the instructions, when executed by the processor, further cause the processor to control the application to perform sending the request via an application programming interface (API) of the OS, and
- for receiving the response, the instructions, when executed by the processor, further cause the processor to control the application to perform receiving the response via the API of the OS.

14. The computing device of claim 10, wherein the instructions, when executed by the processor, further cause the processor to control the application to periodically perform sending the request, receiving the response, determining the correspondence, determining the one or more application accessibility settings, and applying the one or more application accessibility settings.

15. The computing device of claim 10, wherein the one or more application accessibility settings comprise a setting that facilitates interaction with the application by a user with a disability.

16. The computing device of claim 10, wherein the one or more application accessibility settings include at least one of a screen reader feature, a magnifier, closed captioning, and input device shortcuts.

17. The computing device of claim 10, wherein the instructions, when executed by the processor, further cause the processor to control the application to perform exporting the information relating to the one or more OS accessibility settings or information relating to the one or more application accessibility settings to a remote computing device for use in configuring at least one other application.

18. The computing device of claim 10, wherein, for applying the one or more application accessibility settings to the user interface associated with the application, the instructions, when executed by the processor, further cause the processor to control the application to perform turning one of the one or more application accessibility settings on or off.

19. A non-transitory computer-readable medium comprising instructions that, when executed by a processor, cause the processor to control an application executing on a computing device to perform:
- sending, to an operating system (OS) executing on the computing device, a request for information relating to one or more OS accessibility settings defining one or more of OS-level accessibility features that facilitate a user's interaction with the computing device;
- receiving, from the OS, a response including the information relating to the one or more OS accessibility settings;
- determining, based on the received response, a correspondence between one or more of OS-level accessibility features and one or more application-level accessibility features, wherein the one or more application-level accessibility features facilitate the user's interaction with the application;
- determining, based on the determined correspondence, one or more application accessibility settings defining the one or more application-level accessibility features; and
- applying the one or more application accessibility settings to a user interface associated with the application.

20. The non-transitory computer-readable medium of claim 19, wherein, for determining the one or more application accessibility settings, the instructions, when executed by the processor, further cause the processor to control the application to perform identifying the one or more application accessibility settings based on the determined correspondence.

* * * * *